3,076,963
PHASE INDICATORS

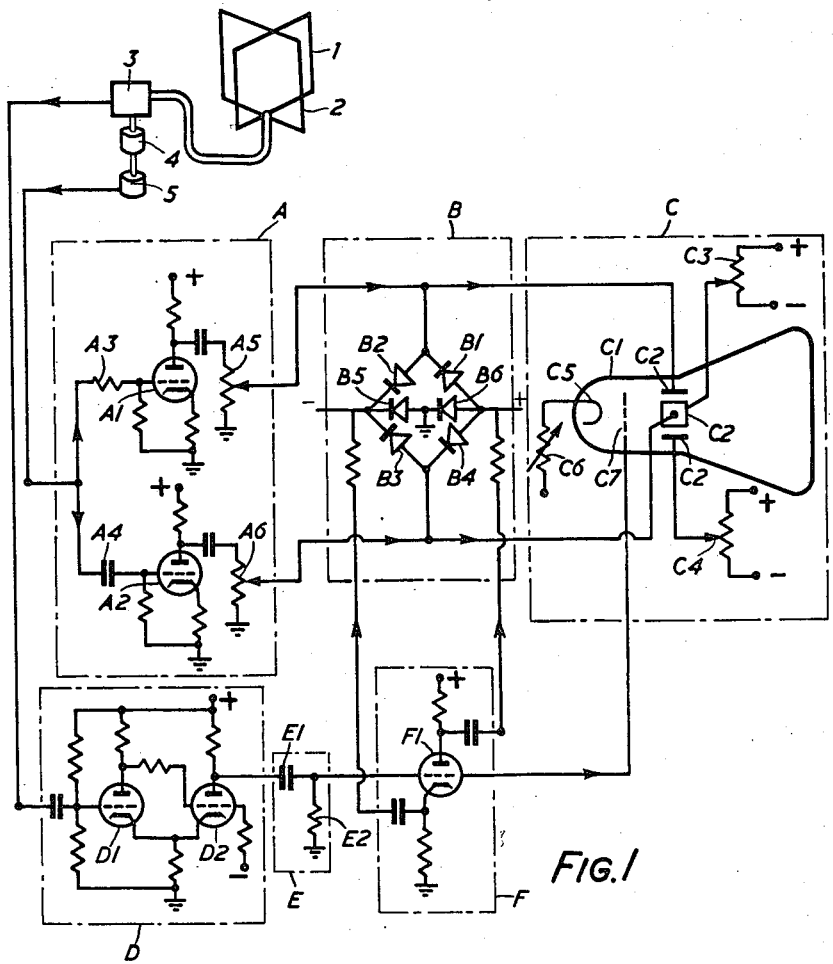
FIG.1
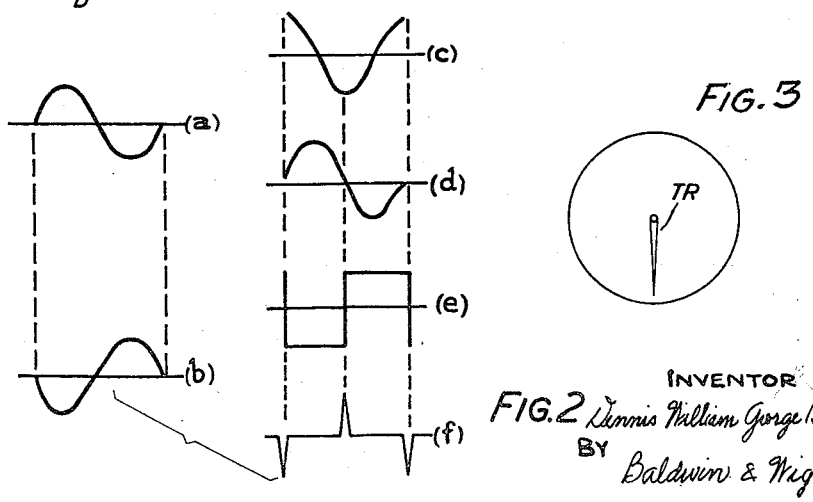
FIG.2
FIG.3
INVENTOR
Dennis William George Byatt
BY
Baldwin & Wight
ATTORNEYS

United States Patent Office 3,076,963
Patented Feb. 5, 1963

Dennis William George Byatt, Great Baddow, England, assignor to Marconi's Wireless Telegraph Company Limited, London, England, a company of Great Britain
Filed Dec. 10, 1959, Ser. No. 858,804
Claims priority, application Great Britain May 26, 1959
8 Claims. (Cl. 343—113)

This invention relates to phase indicators, i.e. to arrangements for indicating the phase relationship between two electrical waves. It is often required for a variety of different purposes to measure and indicate the phase relation between two electrical waves, and the present invention seeks to provide improved and simple means which will indicate phase relationship directly and in a convenient manner on a cathode ray tube. Indeed, as will be seen later, the invention, in its preferred forms, provides phase indicators which will indicate a phase relationship by a cathode ray tube display resembling a simple radial pointer which can be read against a circular scale marked in degrees.

An important application of the invention is to radio direction finders of the well known kind in which a radio directional receiving system, such as a pair of mutually perpendicular crossed frames and a radio goniometer, has its directivity continuously rotated at some predetermined frequency, e.g. by rotating the search coil of the goniometer, and the incoming signal direction is ascertained by comparing the phase of the goniometer output with the phase of a reference oscillation of the same frequency as the frequency of rotation of directivity. When applied to such a direction finder, the present invention provides a very convenient way of measuring the phase relationship between the goniometer output and the reference frequency giving an indication in the form of a cathode ray tube trace resembling a radial pointer moving over a circular scale which can be marked in incoming signal directions.

According to this invention an arrangement for indicating the phase relationship between two electrical waves comprises a display cathode ray tube having mutually perpendicular deflection devices, means for deriving two components in phase quadrature from one of said waves, circuits for applying one of said components to one of said devices and the other to the other, and means controlled by the second of said electrical waves once per cycle thereof for momentarily and substantially changing the amplitudes of said components applied to said devices.

Preferably the means for changing the amplitudes of the quadrature components applied to the deflection devices are constituted by an electronic switching circuit controlled by the second of the electrical waves and adapted to switch the applied quadrature components between maximum and substantially zero values. In a preferred arrangement of this nature the switching circuit is a normally conductive circuit adapted to connect to a point of fixed potential the circuits through which the quadrature components are applied to the deflection devices and means, actuated once per cycle of the second electrical wave, are provided for cutting off said normally conductive circuit. Thus the switching circuit may consist of a diode bridge with six normally conductive diodes, one in each arm, one between one end of one bridge diagonal and earth and one between earth and the other end of said bridge diagonal, and the ends of the other bridge diagonal are connected each to one or other of the two circuits through which the quadrature components are applied to the deflection devices, means, controlled by the second electrical wave being provided for momentarily applying potential to the ends of said first mentioned bridge diagonal to cut off the diodes once per cycle of said second wave. The momentarily applied potential may conveniently be obtained by squaring said second electrical wave, differentiating the resultant squared wave to produce sequential momentary excursions of potential of opposite polarities and selecting and utilising the excursions of one polarity as the momentarily applied potential. So long as the diodes are conductive the quadrature components applied to the deflection means will be "clamped" to earth and thus be of substantially zero amplitude and the cathode ray will adopt its "rest" position. When, however, the diodes are cut off, the cathode ray will be subjected to a circular deflection (assuming that the quadrature components are of equal amplitudes) of a radius dependent on the quadrature component amplitude. The effect, therefore, of momentarily cutting off the diodes will be to produce a radial deflection whose position round the circle is dependent on the phase relation between the two electrical waves. If the ray is cut off except when the diodes are cut off the cathode ray tube will give a pointer-like display, the position of the "pointer" directly indicating the phase relation.

It is preferred to cut off the ray except when the diodes are cut off, in part because of the convenient type of display which is obtained if this is done, and in part in order to prevent "burning" of the screen of the tube by the ray when in its "rest" position. It is a simple matter to have the cathode ray tube normally cut off and to utilise the second electrical wave momentarily to "brighten up" the tube simultaneously with changing the amplitudes of the quadrature components applied to the deflection devices.

It is, of course, possible normally to apply the quadrature components to the deflection devices at full amplitude and to arrange the second wave momentarily to reduce the applied amplitudes once per cycle. If this is done there will be a resultant inward instead of an outward phase indicating radial deflection on the tube screen and, if the tube is arranged to be cut off except when said radial deflection is occurring, the display will again be in the form of a radial line extending, if the applied amplitudes are reduced to zero, to the centre. The described arrangement, with outward radial deflection, is, however, at present preferred.

If the quadrature components are of equal amplitudes, the deflection of the ray will, of course, be circular while, if they are unequal, it will be elliptical. In the case in which the invention is applied to a radio direction finder of the kind referred to, in order to measure the phase between a directionally received signal and a reference frequency, it will often be of advantage to provide manual means for separately adjusting the amplitude of the quadrature components to a desired inequality and for adjusting the rest position of the ray. As is well known, directional aerial systems such as are normally used in direction finders commonly have, when installed, two important components of directional error due to local conditions—namely so-called semi-circular error and so-called quadrantal error. When applying the present invention to such direction finders, it is possible to compensate for semi-circular error by providing means for adjusting the rest position of the ray—e.g. by providing separately adjustable fixed deflection biases on the mutually perpendicular deflection devices; and to compensate for quadrantal error by providing means for adjusting the relative amplitudes of the quadrature components—e.g. by feeding said components to the appropriate mutually perpendicular deflection devices through separately adjustable potentiometers.

The invention is illustrated in the accompanying drawings in which FIGURE 1 is a diagram of one embodiment, and FIGURE 2 is a set of explanatory waveforms and FIGURE 3 is a representation of a figure as viewed on a cathode ray tube.

Referring to FIGURE 1, this shows the invention applied to a radio direction finder of the kind referred to. The direction finder proper is illustrated only schematically since it is well known per se. It is represented by two mutually perpendicular crossed frames 1 and 2 supplying signals to the stator windings of a radio goniometer. This radio goniometer provides an output signal from a search coil to a receiver as in the usual way and the said goniometer and the said receiver are together represented by the block 3 which includes both. The directivity is rotated continuously at a predetermined frequency, e.g. 25 rotations per second, by an electric motor 4 which drives the search coil and which also drives a reference frequency source of fixed phase exemplified as consisting of a generator 5 driven by the same motor. The frequency of the generator is the same as that of rotation and, as is well known, the phase relation between the output from the radio goniometer 3 and that from the reference source 5 will be a measure of the incoming signal direction. The apparatus provided by this invention, i.e. the phase measuring apparatus, consists of the units shown within the chain line rectangles A, B, C, D, E and F. The unit A which receives the output signals from the generator 5 and produces two quadrature components therefrom, is well known per se and is shown as including two valves A1 and A2 of which the former is fed through a resistance A3 and the latter through a condenser A4. The quadrature components which are taken from the unit A are individually manually adjustable by adjusting the sliders on potentiometers A5 and A6 respectively.

The unit C is the display unit and includes a display cathode ray tube C1 shown as of the electrostatic deflection type with the usual mutually perpendicular pairs of plates—X and Y plates—C2. Separately adjustable fixed deflection biases can be applied to the plates, the adjustments being effected by moving the sliders on potentiometers C3 and C4 having resistances connected across suitable bias sources. The cathode C5 of the tube is returned to a suitable potential source through an adjustable resistance C6 and the output is provided with a grid C7 by means of which the ray may be cut off or "brightened."

The outputs from the sliders of the potentiometers A5 and A6 are passed to the deflection plates of the cathode ray tube through suitable circuits as shown and between the circuits are connected what is, in effect, a switching or clamping circuit within the unit B. This switching or clamping circuit is shown as consisting of a diode bridge with six diodes of which four, B1, B2, B3 and B4 are one in each arm and the remaining two, B5 and B6, are respectively between one or other of the ends of one diagonal of the bridge and earth. The ends of the other diagonal of the bridge are connected respectively to the circuit between the potentiometer A5 and one pair of deflection plates and the circuit between the potentiometer A6 and the other pair of deflection plates.

The diodes in the unit B are "poled" as shown and are normally conductive. In this condition both circuits to the deflection plates are clamped to earth and the ray within the tube will adopt a rest position determined by the setting of the adjustment means provided in the unit C. If however, the diodes are cut off, the pairs of deflection plates will receive quadrature inputs from the unit A and if these inputs are of the same amplitude the resultant deflection of the ray will be along a circular path. If the quadrature inputs are of different amplitudes, the deflection of the ray will be along an elliptical path.

The diodes in the unit B are arranged to be momentarily cut off once per cycle of the output from the goniometer 3. It will be seen that each time this is done the ray, previously in its rest position, will be momentarily deflected out and back substantially along a radius whose position round the circle will be dependent upon the phase relationship of the waves from the goniometer and generator 3 and 5.

The cutting off of the diodes in the unit B is effected by means of the units D, E and F. Unit D serves to square the substantially sinusoidal wave from the receiver (not separately shown) included in the unit 3. As shown, unit D is a so-called Schmitt trigger circuit as well known per se and comprising the two valves D1 and D2. The squared output wave from the unit D is differentiated by a differentiating circuit within the unit E and consisting of the condenser E1 and the resistance E2. As will be obvious, unit E will translate the successive rising and falling edges of the squared waves from unit D into momentary "peaks" of voltage of opposite polarities. These peaks of voltage are applied to the grid of the valve F1 in the unit F. This valve is normally cut off but is rendered momentarily conductive by each positive going peak from the unit E. The anode and cathode of the valve F1 are respectively coupled to the opposite ends of that diagonal of the diode bridge in unit B in which the diodes B5 and B6 are included. Accordingly each time a positive pulse is applied to the grid of the valve F1, the diodes in the unit B are cut off and the cathode ray in the tube C1 makes a return radial excursion.

In order to prevent burning of the screen of the tube C1, due to the fact that for most of the time the cathode ray is in its rest position, the said tube is normally cut off and is "brightened up" momentarily when radial excursions of the ray take place by applying to the grid C7 a "brighten up" potential from the unit E.

FIGURE 2 is a set of diagrams illustrating the operation.

FIGURE 2(a) represents a wave from the reference generator 5 and FIGURE 2(b) represents a wave from the goniometer-receiver unit 3, it being assumed in the case illustrated that these waves are in phase opposition. The wave (a) is translated into two quadrature components shown at (c) and (d) respectively of which the former is applied to the X plates of the cathode ray tube and the latter to the Y plates. It is assumed in the drawing of FIGURE 2 that the potentiometers A5 and A6 are set to give equal amplitude quadrature outputs.

The wave (b) is squared by unit D into the square waveform shown at (e) and this is translated by the differentiating unit E into "peaks" of voltage as shown at (f). The middle of the three peaks of voltage at (f), i.e. the positive going peak, cuts off the diodes in the unit B and causes the cathode ray to make a momentary radial excursion in a direction determined by the time of occurrence of the positive going peak in question with relation to the wave (a). The tube C1 is so mounted that, in the case illustrated, where the waves (a) and (b) are in phase opposition, the radial trace represented at TR in FIGURE 3—this diagram is the representation of the face of the cathode ray tube—will be vertically downwards. If the directional aerial installation has semicircular and quadrantal error—as it is likely to do—the former error may be compensated for by adjusting the rest position of the ray by adjusting the potentiometers C3 and C4 and quadrantal error may be compensated for by adjusting the relation between the amplitude of the quadrature outputs from the unit A, i.e. by adjusting the potentiometers A5 and A6.

I claim:

1. An electrical system for indicating the phase relationship between two electrical waves of the same frequency, said system comprising cathode ray tube means having mutually perpendicular deflection devices, means for deriving two components in phase quadrature from one of said waves, circuits for applying one of said components to one of said devices and the other component to the other device, electronic switching means for connecting the applied quadrature components to a point of fixed potential except on the application of a control signal thereto, and means for deriving from the other of said waves, once in each cycle thereof, a signal of short duration relative to the period of said waves, and applying said short duration signal as a control signal to said switching means.

2. A system as claimed in claim 1 wherein said switching means is a normally conductive circuit adapted to connect to a point of fixed potential the circuits through which the quadrature components are applied to the deflection devices and means are provided for cutting off said normally conductive circuit on the occurrence of said control signal.

3. A system as claimed in claim 1 wherein said switching means includes a diode bridge with six normally conductive diodes, one in each arm, one between one end of one bridge diagonal and earth and one between earth and the other end of said bridge diagonal, and the ends of the other bridge diagonal are connected each to one of the two circuits through which the quadrature components are applied to the deflection devices, said means for deriving a signal from the other of said waves including means for applying said control signal to the ends of said first mentioned bridge diagonal to cut off the diodes once per cycle of said second wave.

4. A system as claimed in claim 3 wherein said last mentioned means includes means for squaring said second electrical wave, differentiating the resultant squared wave to produce sequential momentary excursions of potential of opposite polarities and selecting and utilising the excursions of one polarity as the momentarily applied potential.

5. A system as claimed in claim 1 wherein the cathode ray tube means is normally cut off and the second electrical wave is utilised momentarily to "brighten up" the tube simultaneously with changing the amplitudes of the quadrature components applied to the deflection devices.

6. A radio direction finder wherein an arrangement as claimed in claim 1 is provided to indicate the phase between a directionally received signal and a reference frequency.

7. A radio direction finder as claimed in claim 6 wherein manually actuated means are provided for separately adjusting the amplitudes of the quadrature components to a desired inequality and for adjusting the rest position of the beam of said cathode ray tube means.

8. A radio direction finder as claimed in claim 7 wherein separately adjustable fixed deflection biases are provided for the mutually perpendicular deflection devices and wherein the quadrature components are fed to the appropriate mutually perpendicular deflection devices through separately adjustable potentiometers.

References Cited in the file of this patent

UNITED STATES PATENTS 2,571,051    Mizen                Oct. 9, 1951
2,913,721    Ortusi et al.          Nov. 17, 1959

OTHER REFERENCES

Millman, J., and H. Taub, "Pulse and Digital Circuits," p. 455, McGraw-Hill Book Co., Inc., New York, 1956.